(12) United States Patent
Benner et al.

(10) Patent No.: US 9,500,510 B2
(45) Date of Patent: Nov. 22, 2016

(54) DEVICE FOR CONTACTING AT LEAST ONE CONDUCTING TRACK OF A FILLING-LEVEL SENSOR

(71) Applicants: Hans-Guenter Benner, Kriftel (DE); Bernd Pauer, Eppstein (DE); Robert Peter, Sulzbach (DE)

(72) Inventors: Hans-Guenter Benner, Kriftel (DE); Bernd Pauer, Eppstein (DE); Robert Peter, Sulzbach (DE)

(73) Assignee: Continental Automotive GmbH, Hannover (DE)

( * ) Notice: Subject to any disclaimer, the term of this patent is extended or adjusted under 35 U.S.C. 154(b) by 163 days.

(21) Appl. No.: 14/361,542

(22) PCT Filed: Nov. 21, 2012

(86) PCT No.: PCT/EP2012/073164
§ 371 (c)(1),
(2) Date: May 29, 2014

(87) PCT Pub. No.: WO2013/079370
PCT Pub. Date: Jun. 6, 2013

(65) Prior Publication Data
US 2014/0326065 A1    Nov. 6, 2014

(30) Foreign Application Priority Data

Nov. 30, 2011    (DE) ................. 10 2011 087 491

(51) Int. Cl.
  *G01F 23/36* (2006.01)
  *G01F 23/20* (2006.01)
  *G01L 1/22* (2006.01)

(52) U.S. Cl.
  CPC ............. *G01F 23/20* (2013.01); *G01F 23/363* (2013.01); *G01L 1/2287* (2013.01)

(58) Field of Classification Search
  CPC ............................ G01F 23/36; G01F 23/363
  See application file for complete search history.

(56) References Cited

U.S. PATENT DOCUMENTS

| 3,876,967 A | 4/1975 | Hehl et al. |
| 6,176,134 B1 | 1/2001 | Langer |
| 6,425,288 B1 | 7/2002 | Pauer |
| 8,284,064 B2 | 10/2012 | Benner et al. |
| 2004/0255669 A1 | 12/2004 | LaBarge et al. |

FOREIGN PATENT DOCUMENTS

| DE | 2 254 085 A | 5/1974 |
| DE | 2 265 071 C3 | 4/1976 |
| DE | 197 54 521 A1 | 6/1999 |
| DE | 198 42 243 A1 | 4/2000 |
| DE | 10 2007 021 027 A1 | 11/2008 |

*Primary Examiner* — Michael A Lyons
*Assistant Examiner* — Alex Devito
(74) *Attorney, Agent, or Firm* — Cozen O'Connor

(57) ABSTRACT

A device for contacting at least one conducting track has a contact spring that is connected to a pivotable bow by a pivot bearing. The contact spring also has spring elements connected in series for preloading contacts against the conducting track. An axis of the pivot bearing is arranged parallel to the direction of motion of the contacts over the conducting tracks.

9 Claims, 2 Drawing Sheets

DEVICE FOR CONTACTING AT LEAST ONE CONDUCTING TRACK OF A FILLING-LEVEL SENSOR

CROSS-REFERENCE TO RELATED APPLICATIONS

This is a U.S. national stage of application No. PCT/EP2012/073164, filed on 21 Nov. 2012, which claims priority to the German Application No. 10 2011 087 491.7, filed 30 Nov. 2011, the content of both incorporated herein by reference.

BACKGROUND OF THE INVENTION

1. Field of the Invention

The invention relates to a device for making contact with at least one conductor track of a filling level sensor having at least one bow which can be pivoted over the conductor track and having a contact spring arranged on the bow, having a contact prestressed against the conductor track by a spring element of the contact spring, wherein the movement of the contact during the pivoting of the bow corresponds to an arc, and the contact is fabricated in one piece with the spring element of the contact spring.

2. Related Art

Filling level sensors with such devices are used, for example, in fuel containers of contemporary motor vehicles and are known from practice. A lever wire with a float is usually attached to the bow, with the result that the angle of inclination of the bow is a measure of the filling level in the fuel container. The angle of inclination is sensed by the filling level sensor with the contact, which is prestressed against the conductor track. The contact spring of the known filling level sensor is configured in two pieces, wherein a holder clipped to the bow bears a spring element with the contact. A second component is also clipped to the bow and has a second spring element for prestressing the holder. The two spring elements serve to ensure tilt-free and lift-off-free prestressing of the contact against the conductor track. However, the high structural complexity of the contact spring is disadvantageous.

SUMMARY OF THE INVENTION

An object of the invention is to solve the problem of developing a device of the type specified at the beginning in such a way that it is of particularly simple design and ensures tilt-free and lift-off-free prestressing of the contact against the conductor track.

This problem is solved according to an aspect of the invention in that the contact spring has a rotary bearing on the bow, and in that the axis of the rotary bearing is arranged parallel to the direction of movement of the contact over the conductor tracks.

By virtue of this configuration, the rotary bearing of the contact spring permits the contact to rest with its entire face on the conductor tracks. By combining the rotary bearing with the spring element the invention ensures tilt-free and lift-off-free prestressing of the contact against the conductor tracks. The prestressing of the contact by the spring element can therefore be configured particularly easily. The contact spring can therefore be configured in one part. The device according to the invention is therefore of particularly simple design.

Particularly uniform and tilt-free prestressing of two contacts against the conductor track can easily be achieved according to another advantageous development of the invention if the axis of the rotary bearing forms an equilateral triangle with two contacts which are prestressed against a conductor track. The contacts can be prestressed here against a common conductor track or against two independent conductor tracks.

The device according to the invention has a particularly simple structural configuration if the contact spring has two first and second spring elements which are fabricated in one piece and arranged in series.

According to another advantageous development of the invention, the contact spring has a high level of stability if the two contacts are each arranged directly on a first spring element, and if the first spring elements are connected to one another via a crossweb. Furthermore, the two first spring elements permit independent compensation of tolerances of the two contacts. An electrical resistance between the two contacts is also kept Particularly low by the short distance over the crossweb.

According to another advantageous development of the invention, a contribution is made to equalizing the prestress of the contacts if two second spring elements are connected parallel to one another. As a result of this configuration, all the spring elements are subjected to flexural stress. This avoids torsional loading, as could occur in the case of a central second spring element.

A contribution is made to increasing the stability of the device according to the invention if the contact spring has two bearings, connected to one another via a bridge, on the bow. These bearings permit the contacts to rest continuously in parallel on the conductor tracks even in the event of the bow tilting.

According to another advantageous development of the invention, the contact spring can be fabricated particularly cost-effectively if the contact spring has bearing eyelets for bearing pins arranged on the bow. As a result, the contact spring and bow have a particularly low level of wear.

According to another advantageous development of the invention, a contribution is made to reducing the fabrication costs of the contact spring if the contact spring is formed from sheet metal in one piece with the spring elements, the bearing eyelets and the contacts. As a result of this configuration, the contact spring can easily be fabricated using a punching method and bending method, which gives rise to particularly low fabrication costs, in particular in the case of series fabrication.

According to another advantageous development of the invention, a contribution is made to further reducing the risk of the contacts lifting off if a plurality of contact tongues, connected in parallel, of the contacts are prestressed with different prestressing forces against the conductor tracks. Furthermore, the parallel connection of a plurality of contact tongues contributes to increasing the redundancy.

BRIEF DESCRIPTION OF THE DRAWINGS

The invention permits numerous embodiments. In order to clarify its basic principle further, an exemplary embodiment is illustrated in the drawings and described below. In the drawings.

DETAILED DESCRIPTION OF THE PRESENTLY PREFERRED EMBODIMENTS

Figure 1:
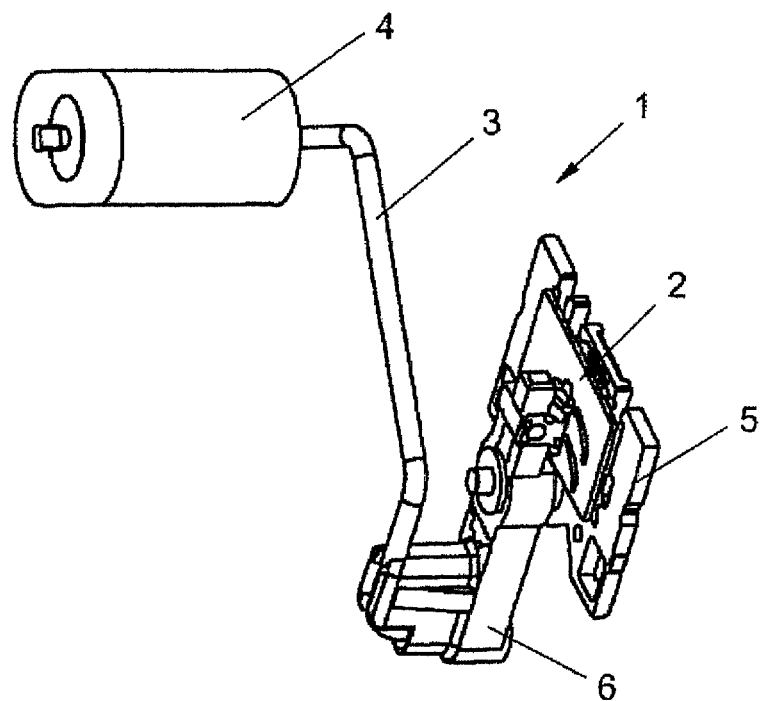
FIG. 1 shows a filling level sensor having a device according to an embodiment of the invention.

FIG. 1 is a schematic view of a filling level sensor 1 which operates according to the lever-type sensor principle and has a potentiometer 2. The filling level sensor 1 senses a filling level of fuel and mounts within a fuel container (not illustrated) of a motor vehicle and has a float 4 arranged on a lever wire 3. The lever wire 3 is attached to a bow 6 pivotably mounted on a carrier 5. For this purpose, the bow 6 has a bow support 7 with a horizontal bearing axis on the carrier 5. When the filling level of fuel in the fuel container changes, the float 4 follows the level of the fuel and in the process pivots the bow 6. The pivoting angle of the bow 6 is sensed by the potentiometer 2 and converted into electrical signals.

Figure 2:
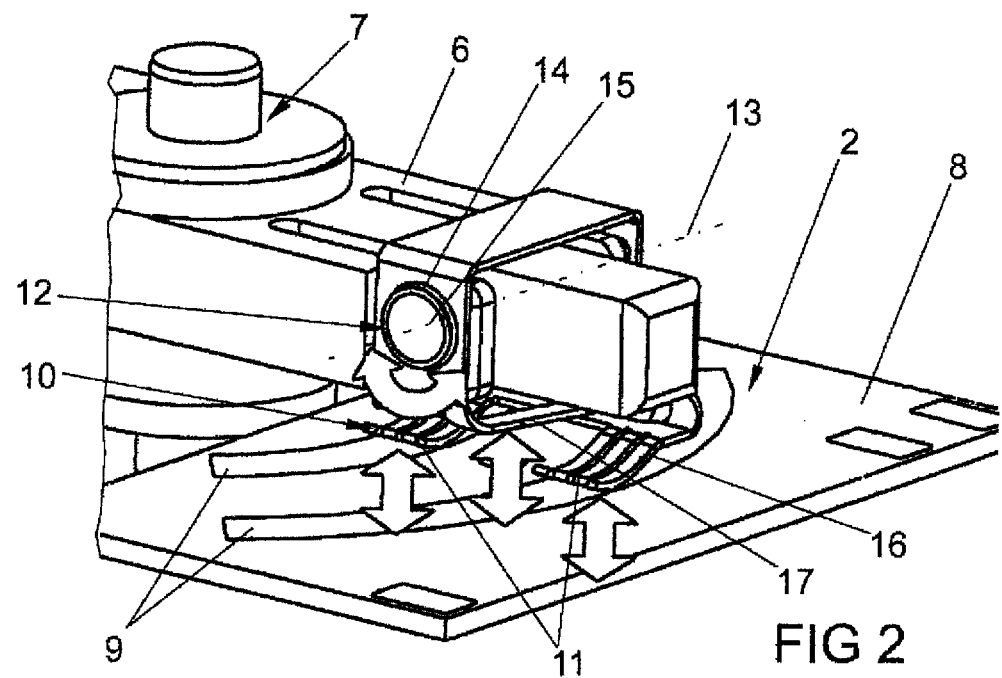
FIG. 2 is an enlarged view of the device according to the invention shown in FIG. 1.

FIG. 2 shows the filling level sensor 1 from FIG. 1 in a magnified form. For the sake of simplification, the filling level sensor 1 is illustrated rotated 90° with respect to FIG. 1. The potentiometer 2 has two arcuate conductor tracks 9 arranged on a printed circuit board 8, and a contact spring 10 for prestressing contacts 11 against the conductor tracks 9. In the case of the conductor tracks 9, a potentiometer can be a resistance network. The printed circuit board 8 is connected to the carrier 5, arranged fixedly in the fuel container, from FIG. 1. The contact spring 10 has a rotary bearing 12 on the bow 6. The axis 13 of the rotary bearing 12 is arranged parallel to the direction of movement of the contacts 11 over the conductor tracks 9. The rotary bearing 12 has bearing eyelets 14 arranged on the contact spring 10 and bearing pins 15 arranged on the bow 6. Furthermore, the contact spring 10 has spring elements 16, 17, which are arranged in series and have the purpose of prestressing the contacts 11 against the conductor tracks 9. For the sake of clarification, the prestresses of the spring elements 16, 17 and the movement of the contact spring 10 on the rotary bearing 12 are characterized in the figure by arrows.

Figure 3:
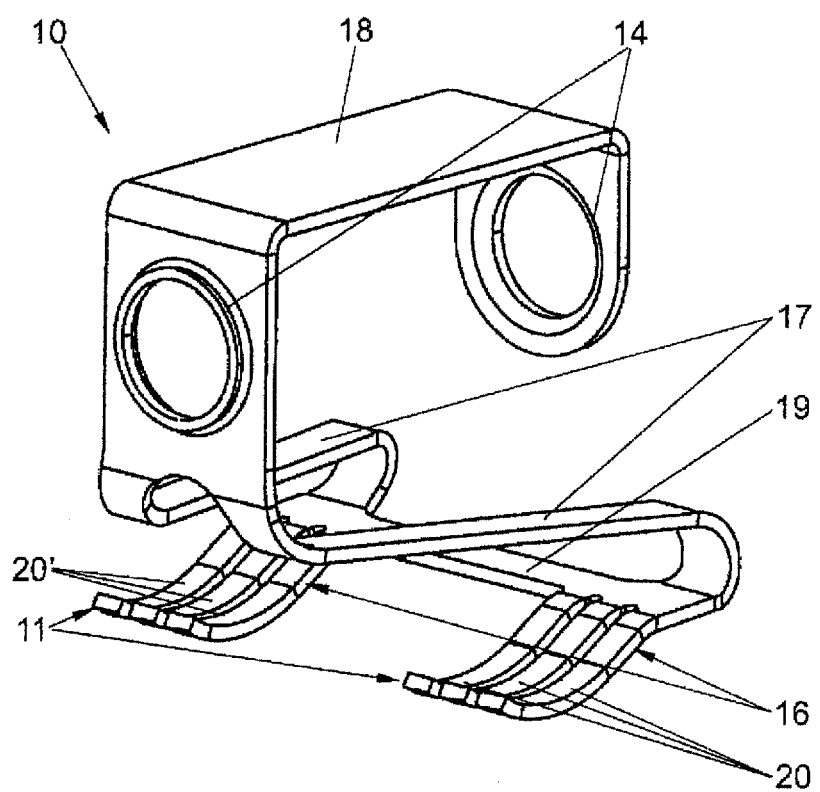
FIG. 3 shows a contact spring of the device from FIG. 2 according to the invention in a highly magnified form.

FIG. 3 is a perspective view of the contact spring 10 from FIG. 2. Here, it is apparent that in order to produce two bearings of the rotary bearing 12 from FIG. 2 the contact spring 10 is fabricated in one piece with two flush bearing eyelets 14, the spring elements 16, 17 and the contacts 11. The bearing eyelets 14 are connected to one another via a bridge 18. The contact spring 10 has two first spring elements 16 near to the contacts 11 and two second spring elements 17 near to the bearing eyelets 14. The first spring elements 16 are connected to one another via a crossweb 19. The contacts 11 are each comprised of a plurality of contact tongues 20, 20' which are arranged one next to the other and connected in parallel. In one embodiment (not illustrated), the contact tongues 20, 20' can have different heights and therefore be prestressed to different degrees against the conductor tracks 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for making contact with at least one conductor track (9) of a filling level sensor (1), comprising:
at least one bow (6) pivotable over the conductor track (9);
a contact spring (10) arranged on the at least one box (6) and having at least one spring element (16, 17); and
at least one contact (11) prestressed against the conductor track (9) by at least one spring element (16, 17) of the contact spring (10),
wherein the at least one box (6) is configured such that movement of the at least one contact (11) during pivoting of the at least one box (6) corresponds to an arc, and the contact (11) is fabricated in one piece with the at least one spring element (16, 17) of the contact spring (10), and
wherein the at least one box (6) has a rotary bearing (12), and an axis of rotation (13) of the rotary bearing (12) is arranged parallel to a direction of movement of the at least one contact (11) over the conductor tracks (9).

2. The device as claimed in claim 1, wherein the at least one contact comprises two contacts, and wherein the axis of rotation (13) of the rotary bearing (12) forms an equilateral triangle with the two contacts (11), which are prestressed against a conductor track (9).

3. The device as claimed in claim 2, wherein the at least one spring element of the contact spring (10) comprises first spring elements (16) and second spring elements (17), which are fabricated in one piece and arranged in series.

4. The device as claimed in claim 3, wherein the two contacts (11) are each arranged directly on the first spring elements (16), and the first spring elements (16) are connected to one another via a crossweb (19).

5. The device as claimed in claim 4, wherein two second spring elements (17) are connected parallel to one another.

6. The device as claimed in claim 5, wherein the contact spring (10) has two bearings connected to one another via a bridge (18) on the at least one box (6).

7. The device as claimed in claim 6, wherein the contact spring (10) has bearing eyelets (14) for bearing pins (15) arranged on the at least one box (6).

8. The device as claimed in claim 7, wherein the contact spring (10) is formed from sheet metal in one piece with the first and second spring elements (16, 17), the bearing eyelets (14) and the contacts (11).

9. The device as claimed in claim 8, wherein the contacts (11) comprise a plurality of contact tongues (20, 20'), connected in parallel and prestressed with different prestressing forces against the conductor tracks.

* * * * *